(12) United States Patent
Yokota et al.

(10) Patent No.: US 7,382,234 B2
(45) Date of Patent: Jun. 3, 2008

(54) DISPLAY UNIT

(75) Inventors: Hiroyuki Yokota, Shizuoka (JP);
Satoshi Saotome, Shizuoka (JP);
Takeshi Matsumura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 214 days.

(21) Appl. No.: 11/262,929

(22) Filed: Nov. 1, 2005

(65) Prior Publication Data
US 2006/0092001 A1    May 4, 2006

(30) Foreign Application Priority Data
Nov. 2, 2004    (JP) .............................. 2004-318861

(51) Int. Cl.
*B60Q 1/00*    (2006.01)
(52) U.S. Cl. ..................... 340/425.5; 340/438; 340/439
(58) Field of Classification Search ............. 340/425.5, 340/438, 439, 440, 441
See application file for complete search history.

(56) References Cited
U.S. PATENT DOCUMENTS
6,157,342 A * 12/2000 Okude et al. ........... 342/357.13
2003/0220722 A1    11/2003 Toba et al. .................... 701/1

FOREIGN PATENT DOCUMENTS

| DE | 42 40 465 A1 | 6/1994 |
|---|---|---|
| DE | 197 54 249 A1 | 6/1999 |
| DE | 198 16 018 A1 | 10/1999 |
| DE | 100 46 763 A1 | 4/2002 |
| DE | 103 03 278 A1 | 8/2004 |
| JP | 62-58112 | 3/1987 |
| JP | 11-248490 | 9/1999 |

OTHER PUBLICATIONS

German Office Action dated Dec. 18, 2006 with English Translation.

* cited by examiner

*Primary Examiner*—Daryl C Pope
(74) *Attorney, Agent, or Firm*—Kratz, Quintos & Hanson, LLP

(57) ABSTRACT

A display unit for a vehicle includes a display device having first and second areas on a display screen and a controller. The controller controls the display device to display first vehicle related data at the first area, or to scroll the displayed first vehicle related data from the first area to the second area according to a scrolling signal. The controller controls the display device to display second vehicle related data at the first area after the displayed first vehicle related data is scrolled out of the first area.

7 Claims, 11 Drawing Sheets

DISPLAY UNIT

This application is based on Japanese Patent Application No. 2004-318861 filed in Japan Patent Office on Nov. 2, 2004, the contents of which are hereby incorporated by reference.

FIELD OF THE INVENTION

The present invention relates to a display unit for a vehicle.

BACKGROUND OF THE INVENTION

One of conventional display units for a vehicle is disclosed in a Japanese patent application JP-A, sho62-58112, as shown in FIGS. 12A and 12B. An instrument panel 120 having the display unit in front of a driver's seat, a steering wheel 121, and a display screen 123 attached to the instrument panel 120 are shown in FIG. 12A. The display screen 123 includes a fixed image area 123 displaying specific data and a selective multiple image area 124 displaying one of a plurality of images, such as three images, selected by a switch. These images are, for example, a tachometer-centered image, an image displaying all items, a safety monitor image, and the like.

A screen 124a displaying the tachometer-centered image is shown in FIG. 12B. A tachometer 125 and a torque split meter 126 indicating a state of torque distribution between front and rear wheels of a four-wheel-drive car are arranged in the screen 124a. A turbocharger boost pressure meter 127, a water-temperature meter 128, and a fuel meter 129 are also arranged on the screen 124a at a lower part thereof.

As shown in FIGS. 13A, 13b, an image area 141 displaying the torque split meter 126 is also used for displaying warning indicators for indicating contents of a trouble that occurred.

That is, as shown in FIG. 13A, a warning indicator 142 indicating, for example, a shortage of brake fluid is also displayed on the image area 141 of the screen 124a instead of the torque split meter 126.

Further, as shown in FIG. 13B, after a specific period from the trouble, the torque split meter 126 and a shrieked warning indicator 142' are displayed in the image area 141.

Another conventional display unit for a vehicle is disclosed in Japanese Patent Application JP-A, hei 11-248490.

A display unit for a vehicle shown in FIG. 14 is used in a combination meter for a vehicle. A bezel 216 and a front pane 217 are mounted in front of a meter case 201.

An LCD panel 202 is mounted inside the meter case 201. A controller 203 is mounted at a rear of the LCD panel 202. A transparent EL panel 204 is mounted in front of the LCD panel 202.

FIG. 15A shows an example image of analog meters of the combination meter. The LCD panel 202 displays a dial plate design 210 as a background image of a speedometer 205, a tachometer 206, a fuel meter 207, a water-temperature meter 208 and the like. The LCD panel 202 also displays a shift lever position indicator 211 at a center thereof. FIG. 15B shows a car navigation screen 212 and warnings 213 at a left half of a screen shown in FIG. 15A.

The transparent EL panel 204 is typically used as a flat panel display. The EL panel 204 is normally transparent, and displays optional character pattern with optional color at an optional area by the controller 203. In this case, the EL panel 204 displays a pointer 215. Namely, the LCD panel 202 displays the background image and the EL panel 204 disposed in front of the LCD panel 202 displays the pointer 215. Thus, a stereoscopic analog meter image like a conventional analog meter is attained.

The conventional display unit as shown in FIGS. 12, 13A, 13B, displays various images, however, they have planar, even, and featureless images.

On the other hand, another conventional display unit shown in FIGS. 14, 15A, 15B, displays a stereoscopic image, however, since an expensive EL panel 204 is employed for displaying a pointer 215, a cost of the display unit increases.

Accordingly, an object of the present invention is to provide a display unit displaying stereoscopic and distinctive images at a low cost.

SUMMARY OF THE INVENTION

In order to attain the object, according to the present invention, there is provided a display unit for a vehicle including:

a display device having first and second areas on a display screen; and a controller for controlling the display device, wherein the controller controls the display device either to display first vehicle related data at the first area, or to scroll the displayed first vehicle related data from the first area to the second area corresponding to a scrolling signal, wherein the controller controls the display device to display second vehicle related data at the first area after the displayed first vehicle related data being scrolled out of the first area.

Preferably, the controller controls the display device to display third vehicle related data at the second area while displaying the first vehicle related data at the first area, and not to display the third vehicle related data when controlling the display device to start scrolling the displayed first vehicle related data corresponding to the scrolling signal.

Preferably, the display unit for a vehicle further includes: a partitioning mechanism disposed on the display screen for surrounding the displayed first vehicle related data and separating the same form the other displayed data; and a transferring mechanism for transferring the partitioning mechanism in synchronization with the first vehicle related data being scrolled.

Preferably, the controller controls the display device to stop scrolling the displayed first vehicle related data when a transfer of the partitioning mechanism is interrupted.

Preferably, the partitioning member includes a partition for separating the displayed first vehicle related data from the other displayed data, and a lens for magnifying the displayed first vehicle related data.

Preferably, the transferring mechanism includes a frame supporting the partitioning mechanism at a front side of the display device and extending at a backside of the display device, a motor attached to the backside of the display device, and a transmission device for transmitting driving power from the motor to the frame to transfer the frame.

Preferably, the display unit for a vehicle further includes a sound generator for producing sound effect accompanying the transfer of the partitioning mechanism.

These and other objects, features, and advantages of the present invention will become more apparent upon reading of the following detailed description along with the accompanied drawings.

DESCRIPTION OF THE PREFERRED EMBODIMENTS

An embodiment of a display unit for a vehicle 1 according to the present invention will be described below with reference to FIGS. 1 to 8.

Figure 1:
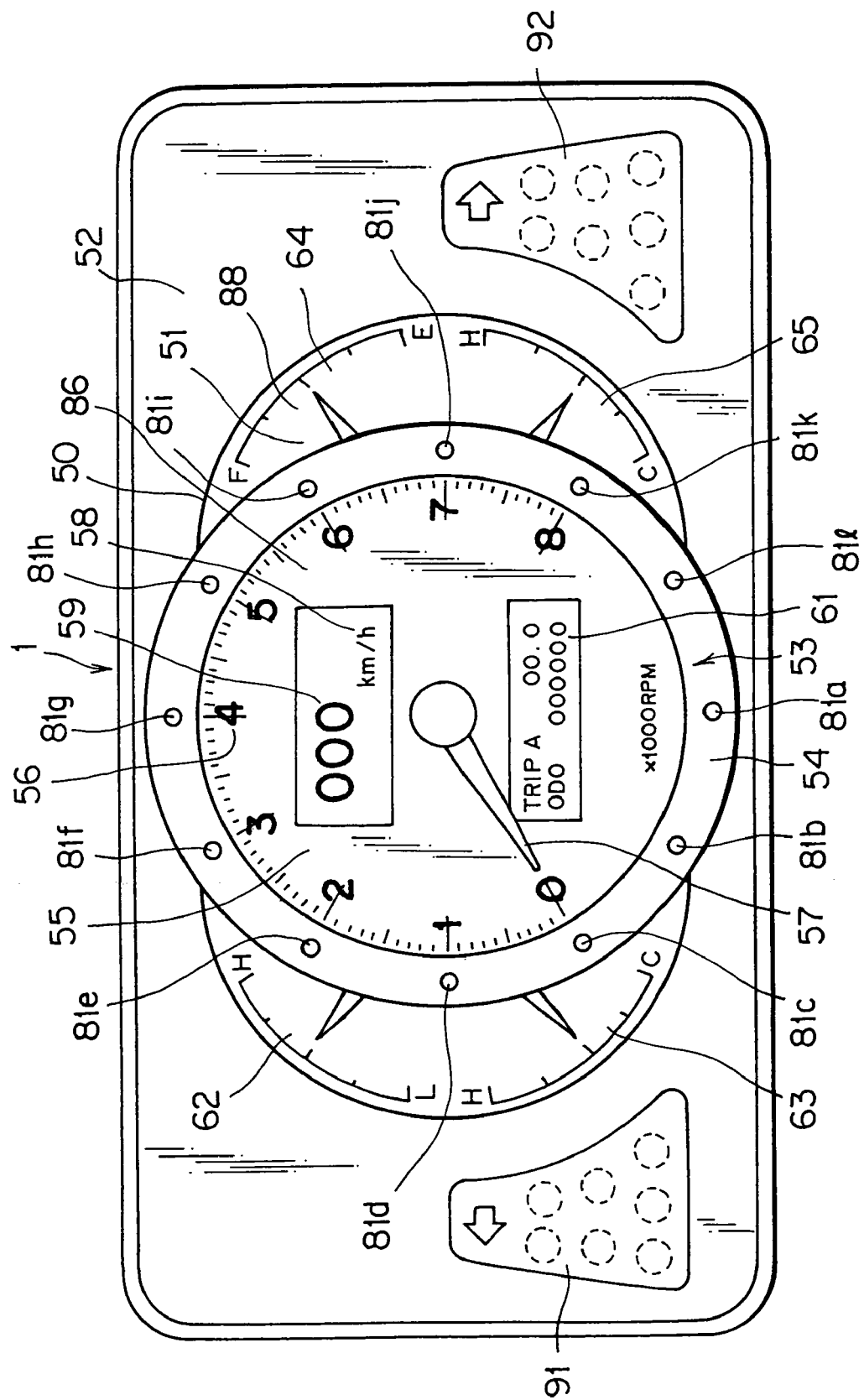
FIG. 1 is a front view showing an embodiment of a display unit for a vehicle according to the present invention.

As shown in FIG. 1, a graphic meter 50 is disposed at the front center of the display unit for a vehicle 1. Warning areas 91, 92 are disposed at right and left sides of the display unit for a vehicle 1.

The graphic meter 50 includes an LCD (liquid crystal display) 51, a bezel 52 partially covering a display screen of the LCD 51, and a screen partition mechanism 53. The LCD 51 has a substantially rectangular display screen, but since the bezel 52 having a substantially oval opening partially covers the LCD 51, the display screen is shown oval. The LCD 51 displays various data concerning a state of the vehicle.

The partition mechanism 53 is disposed at the center of the oval display screen. The partition mechanism 53 is made of opaque plastic material, and includes a ring-shaped partition member 54 having an circular opening at the center thereof, and a lens 55 fitted into the opening. The lens 55 may be a convex lens, or a concave lens, and here the lens 55 is a convex lens. Twelve LED lights 81a to 81l are arranged at substantially even intervals on the ring-shaped partition member 54.

A dial image 56 designed corresponding to a substantially circular dial plate for indicating measured data of a running state of the vehicle is displayed on a first image area of the LCD 51 surrounded by the opening of the LCD 51. The dial image 56 indicates a tachometer as a first vehicle-related data having graduations at a periphery thereof. A pointer 57 is also displayed on the first image area. The dial image 56 and the pointer 57 compose an analog meter.

A sub area 58 is disposed at the center of the dial image 56 for indicating other data except the tachometer. For example, a digital speedometer area 59, and odometer/trip meter area 61 are disposed on the sub area 58.

For example, an oil pressure meter area 62 and an oil temperature meter 63 are disposed on an area of the display screen of the LCD 51, surrounded by the outer periphery at the left side of the ring-shaped partition member 54 and the bezel 52.

For example, both a fuel meter area 64 and a water temperature meter area 65 are disposed on a second image area of the display screen of the LCD 51, surrounded by the outer periphery at the right side of the ring-shaped partition member 54 and the bezel 52. The fuel meter data and the water temperature data correspond to a third vehicle related data.

The display unit for a vehicle 1 is able to transfer the partition mechanism 53 in a longitudinal direction of the oval display screen of the LCD 51.

Figure 2:
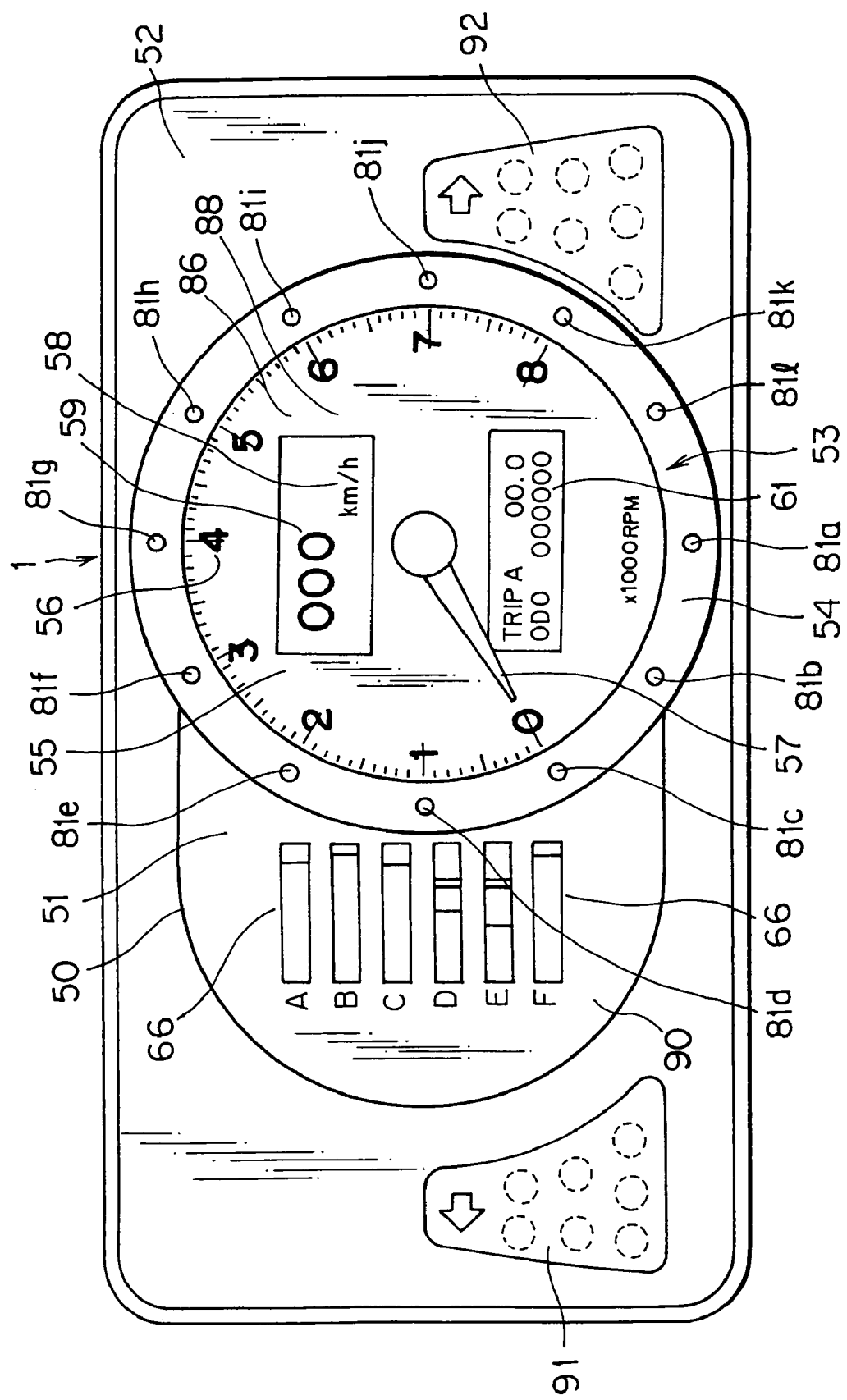
FIG. 2 is a front view showing the display unit of FIG. 1 having a transferring partition mechanism.
Figure 3:
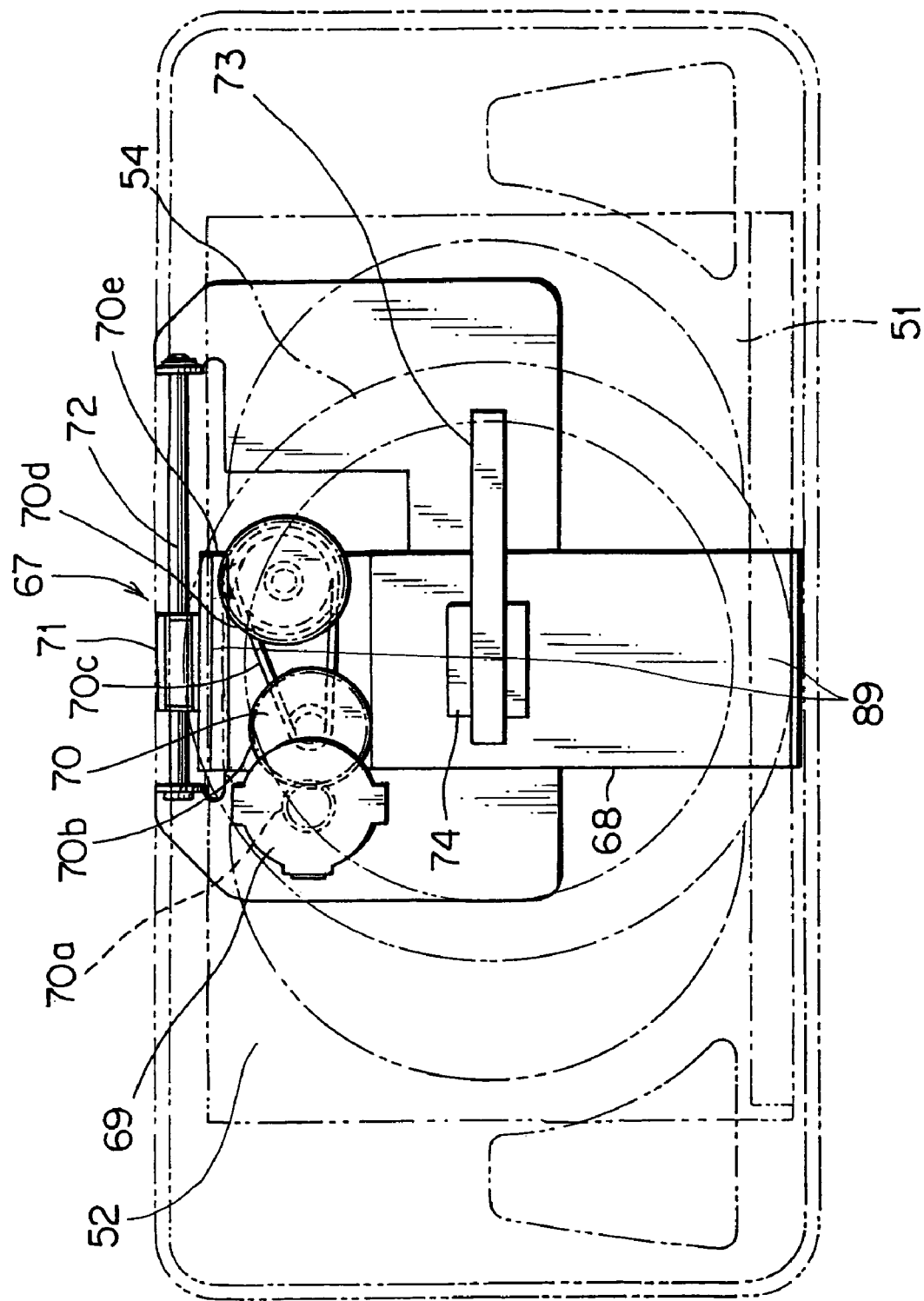
FIG. 3 is a perspective front view for explaining the transferring mechanism.
Figure 4:
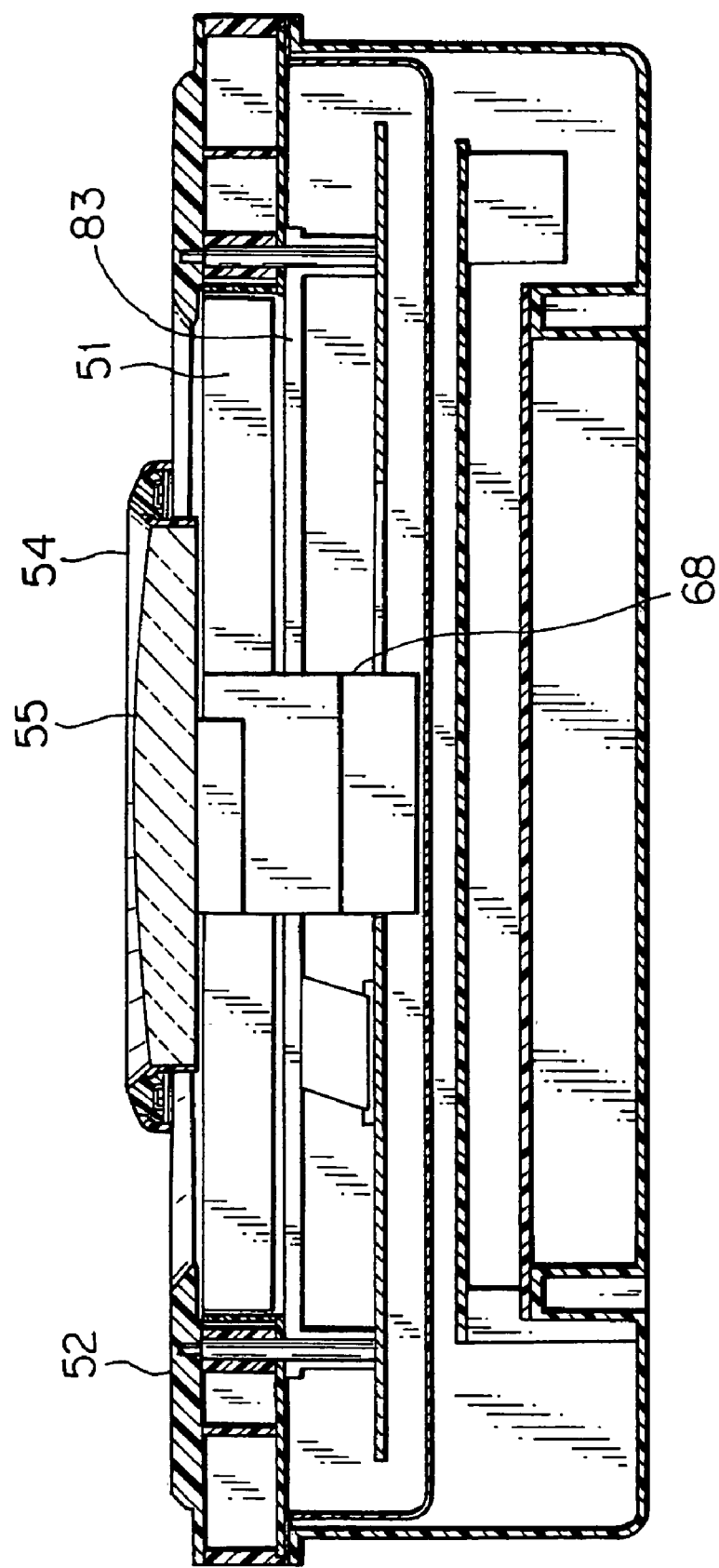
FIG. 4 is a perspective bottom view for explaining the transferring mechanism.
Figure 5:
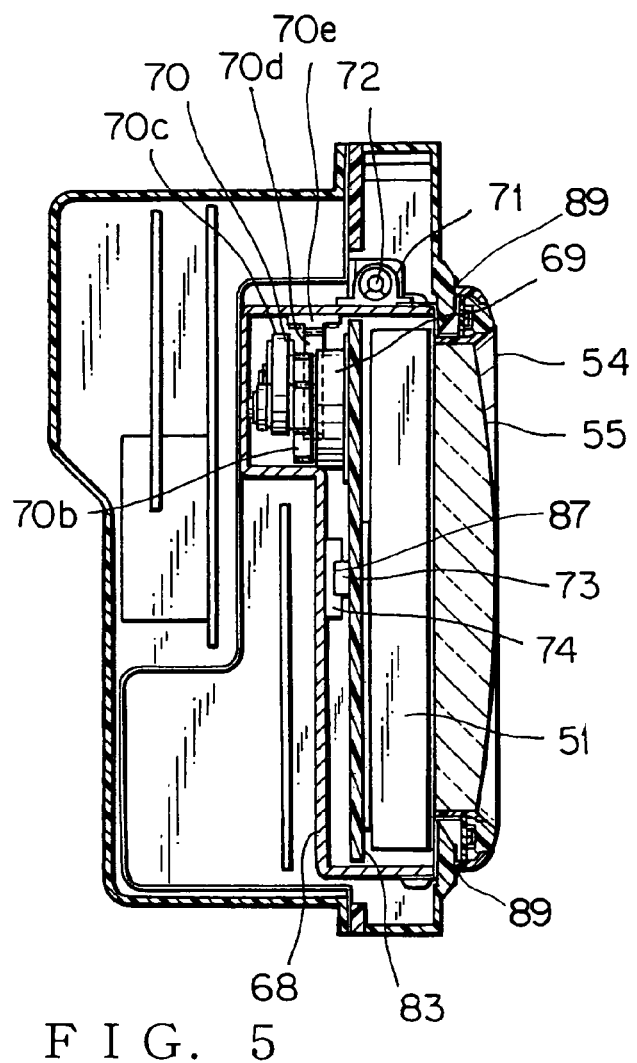
FIG. 5 is a perspective left side view for explaining the transferring mechanism.

FIG. 2 shows the partition mechanism 53 transferred from the center to the right side of the oval display screen of the LCD 51. The dial image 56 is also transferred from the center to the right side of the oval display screen of the LCD 51 in synchronization with the partition mechanism 53. After the transfer is completed, the dial image 56 is displayed surrounded by the ring-shaped partition member 54 as same as before the transfer.

At the same time of the beginning of the transfer of the partition mechanism 53 and the dial image 56, the images on the oil pressure meter area 62 and the oil temperature meter 63 at the left side of the display screen of the LCD 51 and the images on the fuel meter area 64 and the water temperature meter area 65 at the right side of the same are canceled. After the transfer of the partition mechanism 53 and the dial image 56, other vehicle related data as second vehicle related data is displayed on a widened area from the center to the left side of the display screen. For example, as shown in FIG. 2, oil level, brake fluid level, water temperature, exhaust temperature, intake temperature, washer level and the like are displayed.

Next, a transferring mechanism 67 for transferring the partition mechanism 53 will be explained. The transferring mechanism 67 includes a frame 68 having both ends respectively connected to top and bottom parts of a back board of the ring-shaped partition member 54 at a backside of the bezel 52 at top and left of the LCD 51, a motor 69 as a driving source disposed on a backside of a substrate 83 to which the LCD 51 is attached, and a transmission 70 for transmitting driving force of the motor 69 to the frame 68. The transferring mechanism 67 also includes a first supporting member 71 for supporting partially the frame 68 at the top of the LCD 51, a shaft 72 attached to a housing of the display unit for a vehicle 1 substantially parallel to a longitudinal direction of the oval display screen and into which the first supporting member 71 is slidably fitted, a rail 73 disposed at the backside of the substrate 83 substantially parallel to the longitudinal direction of the oval display screen, and a second supporting member 74 attached to the frame 68 and on which a guiding groove for guiding the rail 73 is formed.

The transmission 70 includes a gear 70a fixed to a rotary shaft of the motor 69, a gear 70b engaging with the gear 70a, a pinion 70d to which rotation of the gear 70b is transmitted through a belt 70c, and a rack 70e for transforming the rotation of the pinion 70d into linear motion parallel to a longitudinal direction thereof.

Figure 6:
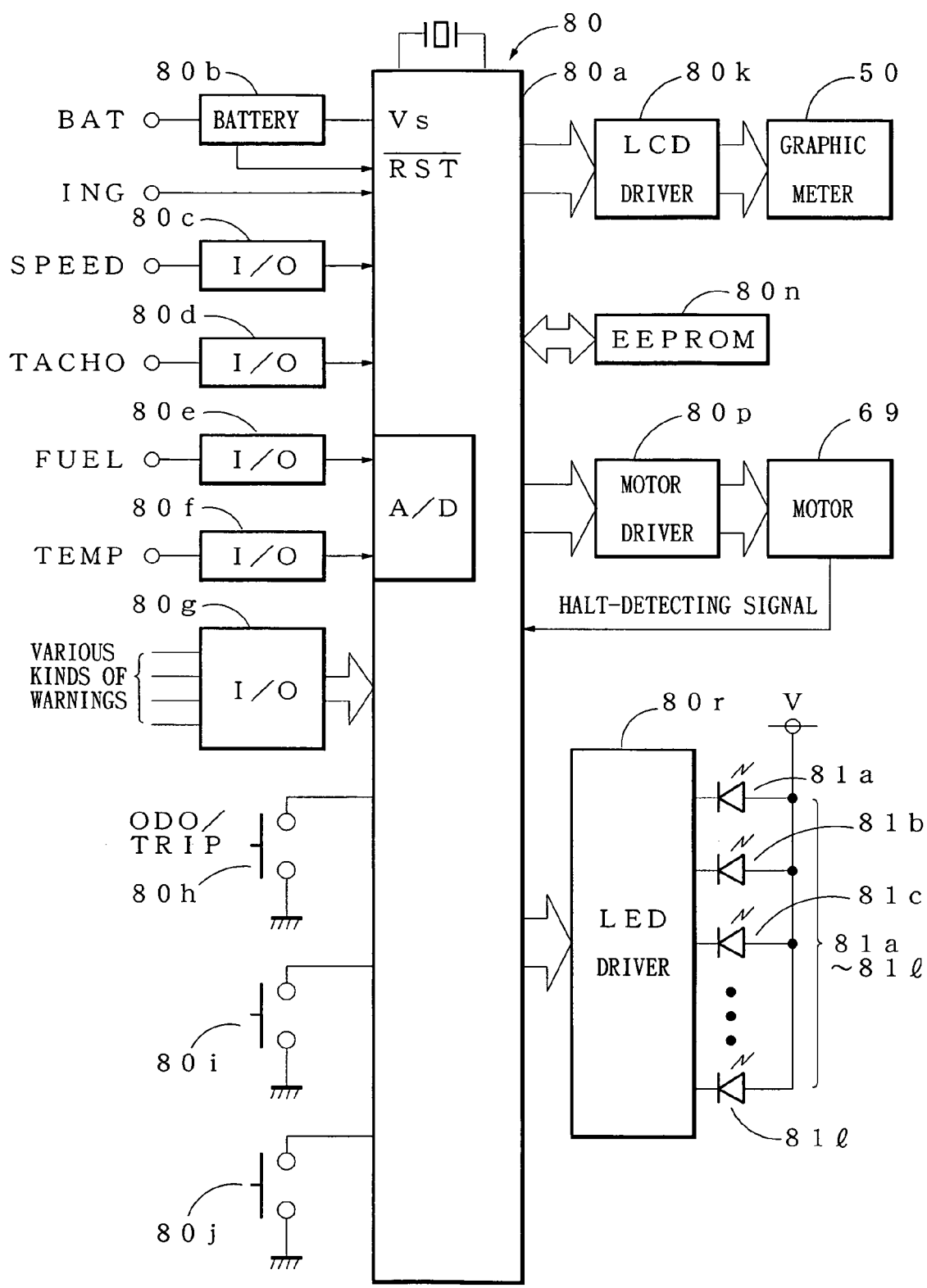
FIG. 6 is a block diagram showing an electric configuration of the display unit for a vehicle.

FIG. 6 shows a block diagram of a main electric configuration of a controller 80 installed on the substrate 83 for controlling the graphic meter 50 of the display unit for a vehicle 1. The controller 80 includes a microcomputer (CPU) 80a; a power supply circuit 80c connected to a battery (not shown) for supplying proper voltage to the CPU 80a; an input/output circuit 80c into which a vehicle speed detecting signal from a vehicle speed sensor (not shown) is inputted; an input/output circuit 80d into which a tachometer signal from a tachometer sensor (not shown) is inputted; an input/output circuit 80e into which a fuel level signal from a fuel level sensor (not shown) is inputted; an input/output circuit 80f into which a water temperature signal from a water temperature sensor (not shown) is inputted; an input/output circuit 80g into which other signals from other sensors (not shown) are inputted; a switch 80h between a odometer and a trip meter; a scrolling switch for a image displayed on the display screen and the partition mechanism 53; a switch 80j for rotating the lights of the LEDs 81a to 81l mounted on the ring-shaped partition member 54; an LCD driver 80k into which various data is inputted from the CPU 80a and driving the LCD 51 (TFT-LCD) of the graphic meter 50; an EEPROM 80n; a motor driver 80p for driving the motor 69, and an LED driver 80r for driving the LEDs 81a to 81l.

Figure 7:
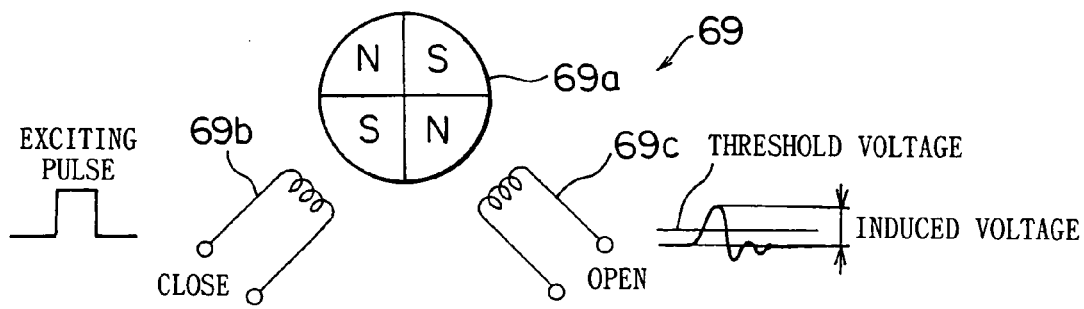
FIG. 7 is a schematic view showing an example of a motor configuration of the transferring mechanism.

The motor 69 is a stepper motor. In the stepper motor 69 as shown in FIG. 7, supplying a plurality of exciting pulses, which composes exciting steps, to an exciting coil 69b drives a rotor 69a having alternately polarized magnetic poles. Further, the stepper motor 69 includes an induced-voltage detecting coil 69c. This detecting coil 69c is in an open circuit, not in use for driving the rotor 69a, and generates the induced voltage corresponding to rotations of the rotor 69a. Whether the rotor 69a is rotated or not can be detected by whether the induced voltage is larger than a threshold voltage or not. Therefore, this induced voltage generated by the detecting coil 69c is applied to a halt-detecting signal of the motor 69, and inputted into the CPU 80a.

Further, the EEPROM 80n previously stores a standard number of exciting steps required for moving the ring-shaped partition member 54 from a start position to a stop position by the motor 69.

Figure 8:
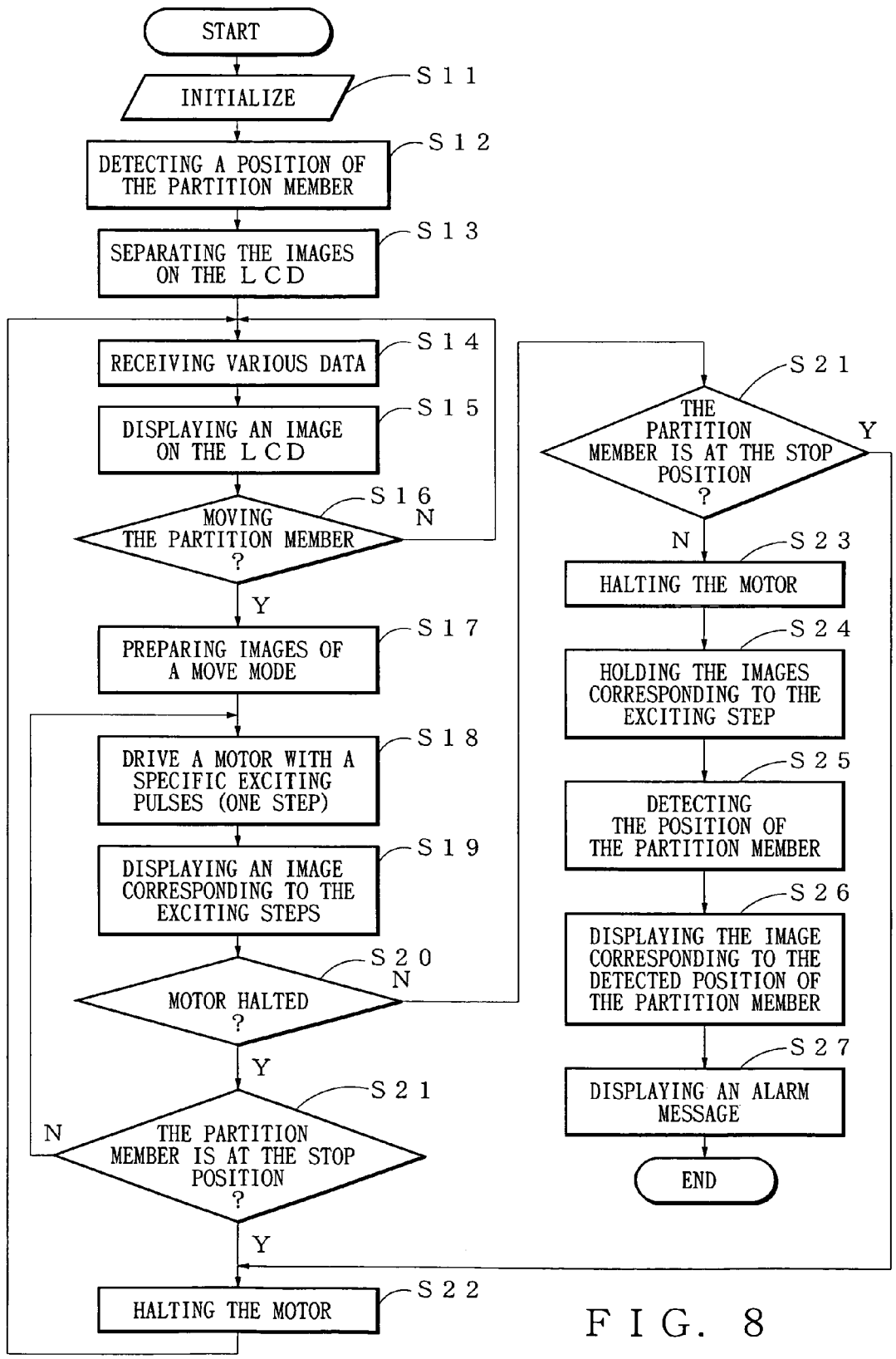
FIG. 8 is a flow chart of a controller according to the embodiment of the present invention.

A process flow of the CPU 80a in the above-described controller 80 will be explained with reference to FIG. 8. At first, in step S11, the power of the display unit for a vehicle 1 is on, and each part of the controller 80 is initialized.

Figure 12A:
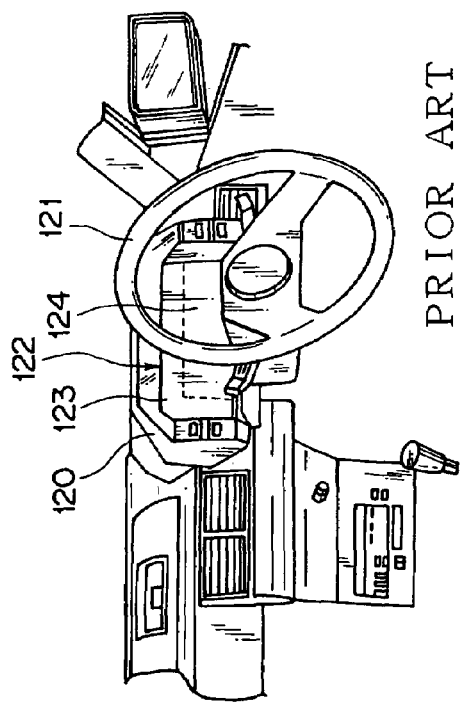
FIG. 12A is a schematic diagram of a first conventional display unit for a vehicle.
Figure 12B:
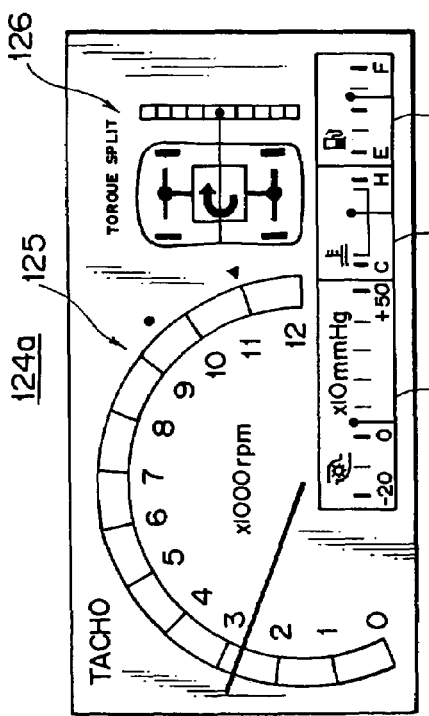
FIG. 12B is a front view showing a first example image displayed on the first conventional display unit for a vehicle.
Figure 14:
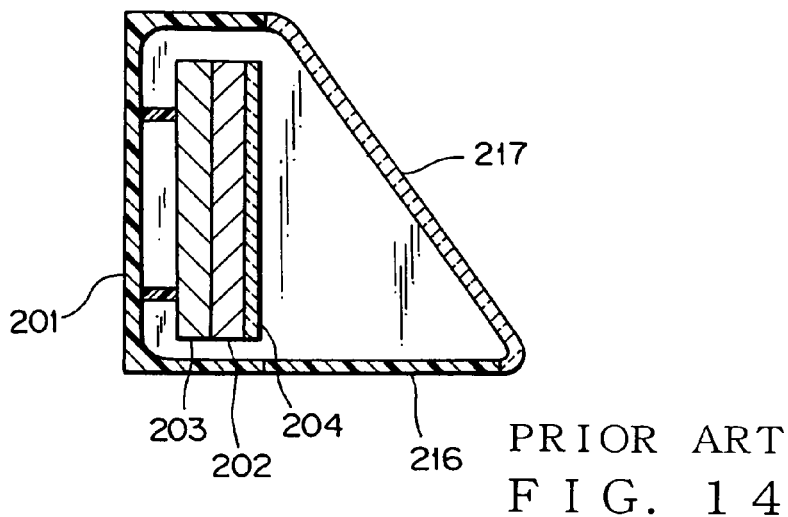
FIG. 14 is a vertical sectional side view showing a second conventional display unit for a vehicle.
Figure 15A:
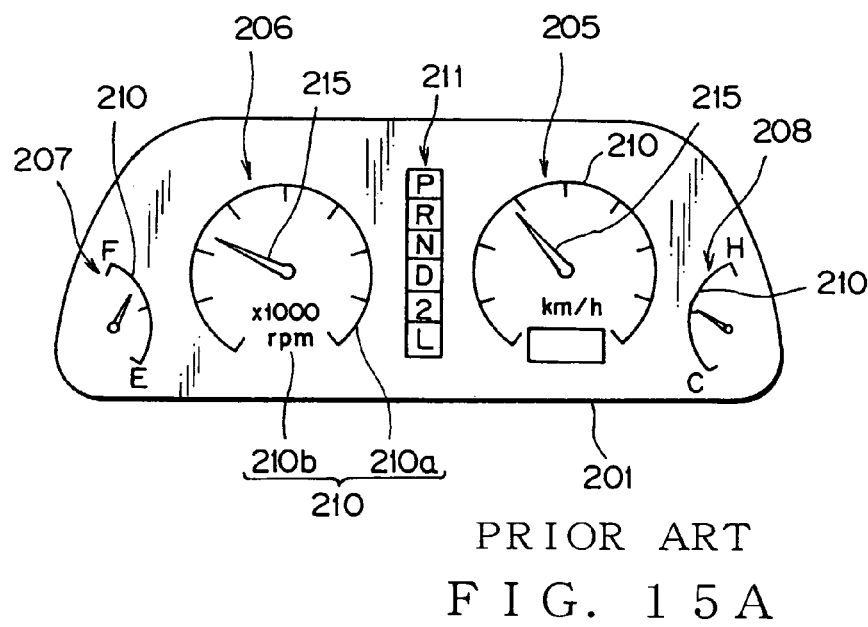
FIG. 15A is a front view showing an example image having analog meters displayed on the second display unit for a vehicle.
Figure 15B:
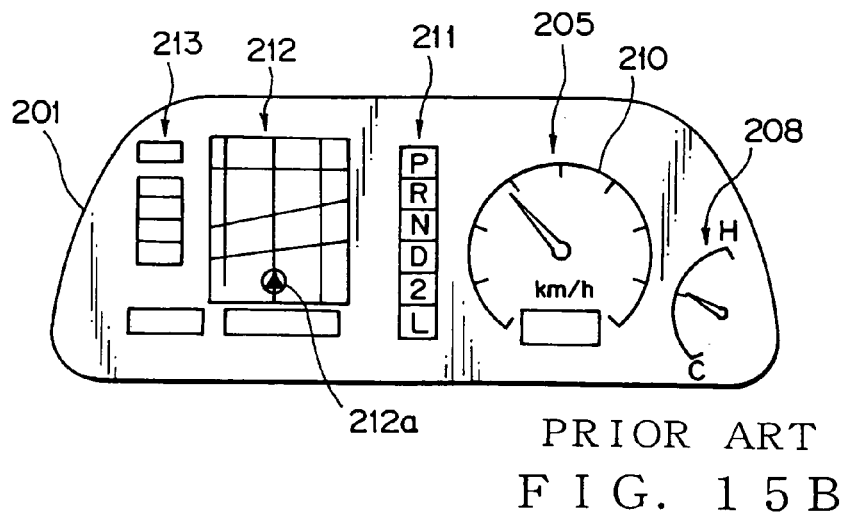
FIG. 15B is a front view showing an example image having an analog meter and a car navigation screen displayed on the second display unit for a vehicle.

Next, in step S12, a position of the ring-shaped partition member 54 is detected. Next, in step S13, the image displayed on the LCD 51 is separated. Next, in step S14, various detecting signals are inputted. Next, in step S15, an initial image is displayed on the display screen of the graphic meter 50. This initial image is, for example, the image shown in FIG. 12, on which the dial image 56 and the pointer 57 are displayed corresponding to the rotation of the engine, and analog meters are displayed on the oil pressure meter display area 62, the oil temperature meter display area 63, the fuel meter display area 64, and the water temperature display area 65 corresponding to the respective measured value from the various sensors.

In this step S15, the images of the dial image 56 and the pointer 57 are surrounded by the ring-shaped partition member 54 and magnified by the convex lens 55. These magnified images look like being higher than the other images on the same display screen, and like independent stereoscopic images. Thereby, novel images can be displayed.

Next, in step S16, whether moving the ring-shaped partition member 54 is requested or not is judged. This judgement is based on a status of a manual switch 80i as a data scrolling signal and a detection of an automatic emergency signal. This emergency signal is generated if, for example, a water temperature alarm signal is inputted from the input/output circuit 80f.

If the switch 80i is off, and the emergency signal is not generated, namely the CPU 80a judges "No" in step S16, the process flow returns to step S14. In this case, the various detecting signal inputs and the initial image are updated in step S14 and S15.

On the other hand, if the switch 80i is on, or the emergency signal is generated, namely the CPU 80a judges "Yes" in step S16, the process flow goes to step S17. In step S17, for replacing the images displayed on the LCD 51, images of a move mode previously stored in the EEPROM 80n are read out (but not displayed yet). This move mode is predetermined to either a constant speed mode or an increasing speed mode corresponding to a characteristic of the motor 69. In this embodiment, the move mode is configured to the increasing speed mode.

In such an increasing speed mode, movements of the images surrounded by the ring-shaped partition member 54, and the ring-shaped partition member 54 are completely synchronized from the start position to the stop position. Therefore, normal and comfortable meter images can be displayed. In case of the constant speed mode, a mismatch between the constant movement of the images and the increasing movement of the ring-shaped partition member 54 owing to the characteristic of the motor 69 is occurred at the stop time and the start time. Therefore, a character of the ring-shaped partition member 54 (mechanical part of the display unit for a vehicle 1) is emphasized in this constant speed mode.

Next, in step S18, the motor 69 starts to drive the ring-shaped partition member 54 a specific length (one exciting step) with specific exciting pulses. Accordingly, in the transferring mechanism 67, the rotation of the motor is transmitted to the pinion gear 70d via the gears 70a, 70b, and the belt 70c of the transmission 70. Then, the rotation of the pinion gear 70d is converted to a linear motion by the rack 70e, and the frame 68 is moved straightforward. In this case, the frame 68 is supported by the first support 71 slidably fitted on the shaft 72 and the second support 74 having the guiding groove 87 for guiding the rail 73. Therefore, the frame 68 is moved in the direction parallel to the major axis of the substantially oval display screen of the LCD 51, namely, rightward in FIG. 1. As the movement of the frame 68, the ring-shaped partition member 54 attached to the partition mechanism 53 is moved similarly from the center to the right side of the display screen of the LCD 51.

Next, in step S19, the images previously read out in step S17 are displayed corresponding to the exciting step. Thus, the images of the dial image 56 and the pointer 57 are moved from the center to the right side of the display screen in synchronization with the movement of the ring-shaped partition member 54. Further, before the movement of the images of the dial image 56 and the pointer 57, the other images displayed on such as the oil pressure meter display area 62, the oil temperature meter display area 63, the fuel meter display area 64, and the water temperature display area 65 are deleted.

During a repetition of steps S17 to S21, the images of the dial image 56 and the pointer 57 are moved continuously in such a speed as to be visible. During the movement, the images of the dial image 56 and the pointer 57 are visible through the opening of the ring-shaped partition member 54.

Next, in step S20, whether a driving condition of the motor 69 is normal or not is judged. This judgement is based on a positional detection of the ring-shaped partition member 54, and a halt-detecting signal from the motor 69. For example, if the movement is interrupted by a trouble of the transferring mechanism 67, the motor 69 is halted and the level of the halt-detecting signal is less than the threshold voltage. Thereby, the CPU 80*a* judges the halt of the motor 69, and the process flow goes to step S21'. If the halt-detecting signal is more than the threshold voltage, the process flow goes to step S21.

In step S21', the CPU 80*a* compares a counting pulse number of the exciting pulses (or exciting steps) from the start position to a halt position counted by the CPU 80*a*, with a reference pulse number (or reference exciting steps), which is necessary for the ring-shaped partition member 54 to reach the stop point. If the counting pulse number is less than the reference pulse number, CPU 80*a* judges that the ring-shaped partition member 54 is halfway between the start and stop positions, because the pulse number of the exciting pulses is less than the reference pulse number, while the motor 69 is halted. Resultingly, the CPU 80*a* judges that the motor 69 is in trouble and goes to step S23. If the counting pulse number is equal to the reference pulse number, the process flow goes to step S22.

In step S21, the CPU 80*a* compares the counting pulse number of the exciting pulses (or exciting steps) counted by the CPU 80*a*, with the reference pulse number (or reference exciting steps). If the counting pulse number is less than the reference pulse number, CPU 80*a* judges that the ring-shaped partition member 54 is halfway between the start and stop positions, namely "No", and the process flow returns to step S18. If the CPU judges "Yes", the process flow goes to step S22. In step S22, the motor 69 is halted. After the halt of the motor 69, the process flow returns to step S14.

Figure 13A:
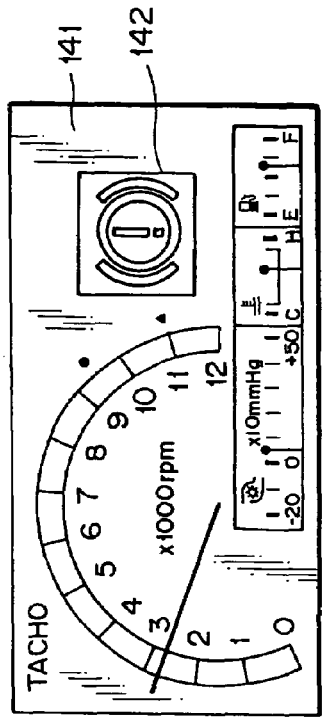
FIG. 13A is a front view showing a second example image displayed on the first conventional display unit for a vehicle.
Figure 13B:
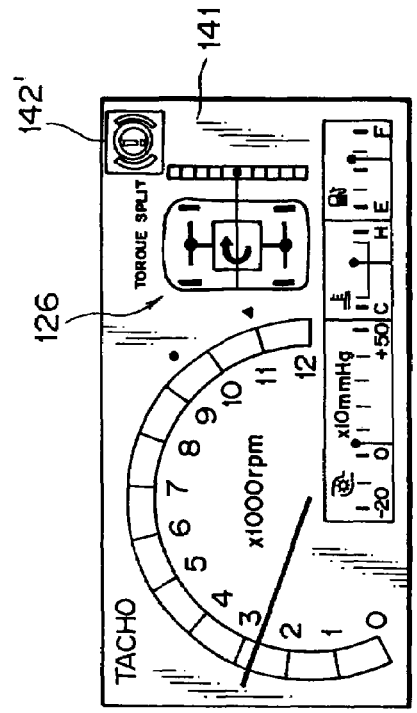
FIG. 13B is a front view showing a third example image displayed on the first conventional display unit for a vehicle.

When the movement of the ring-shaped partition member 54 is ended, the images of the dial image 56 and the pointer 57 are visible via the opening of the ring-shaped partition member 54. Further, as shown in FIG. 13, status bars 66 of such as the oil level meter, the brake fluid meter, the water temperature meter, the exhaust temperature meter, an intake gas temperature meter, a washer level meter, and the like are displayed on the display area 90, on which the dial image 56 and the pointer 57 were displayed in the initial image. If the emergency signal is generated in step S16 corresponding to an increase of the water temperature, the water temperature meter bar is displayed differently from the other meter bars to get a vehicle driver's attention. For example, the water temperature meter bar may blink or have a different color.

After the end of the movement of the ring-shaped partition member 54, when the switch 80*i* is on again, namely "Yes" in step S16, the ring-shaped partition member 54 reverts to the initial state shown in FIG. 1 by a counter rotation of the motor, and redrawn images according to steps 17 to 21.

On the other hand, if the motor 69 is judged to be in trouble in step S20', namely "No" in step S20', the process flow goes to step S23 and the power of the motor 69 is cutoff. Then, in step S24, the images of the dial image 56 and the pointer 57 corresponding to the exciting steps are held. Next, in step S25, the halt position of the ring-shaped partition member 54 is detected.

Next, in step S26, the images of the dial image 56 and the pointer 57 are displayed on the display screen of the LCD 51 at a position corresponding to the detected halt position of the ring-shaped partition member 54 to be visible via the opening of the ring-shaped partition member 54. Next, in step S27, a message about the motor trouble is displayed on the LCD 51.

According to the above, even if the movement of the ring-shaped partition member 54 is interrupted by such as a malfunction of the transferring mechanism 67, there is no mismatch between the position of the ring-shaped partition member 54 and the images of the dial image 56 and the pointer 57.

Thus, according to the display unit for a vehicle of the present invention, a low-cost, vivid, stereoscopic, and novel display image can be attained. Further, since the transferring mechanism 67 is covered by the bezel 52 and the LCD 51, the transferring mechanism 67 is prevented from being visible while the ring-shaped partition member 54 is moved. Therefore, an appearance of the graphic meter 50 is prevented from being spoiled.

Figure 9:
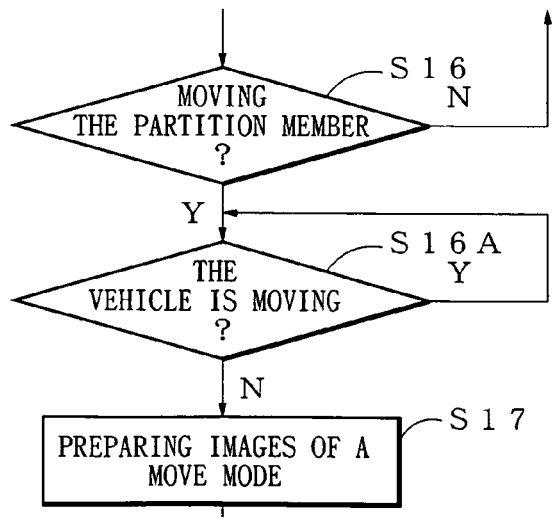
FIG. 9 is a flow chart of a controller according to a second embodiment of the present invention.

Having now fully described the embodiment, however, the present invention is not limited to these embodiments described above. For example, it is possible not to move the ring-shaped partition member 54 and the images of the dial image 56 and the pointer 57 while the vehicle is moving. Specifically, as shown in FIG. 9, step S16A, for judging whether the vehicle is moving or not, is inserted between step S16 and step S17 in FIG. 8. Thereby, the process flow may proceed to step S17 and to further steps only when the vehicle is moving. This judgement in step S16A is based on, for example, the speed detecting signal from the vehicle speed sensor.

Figure 10A:
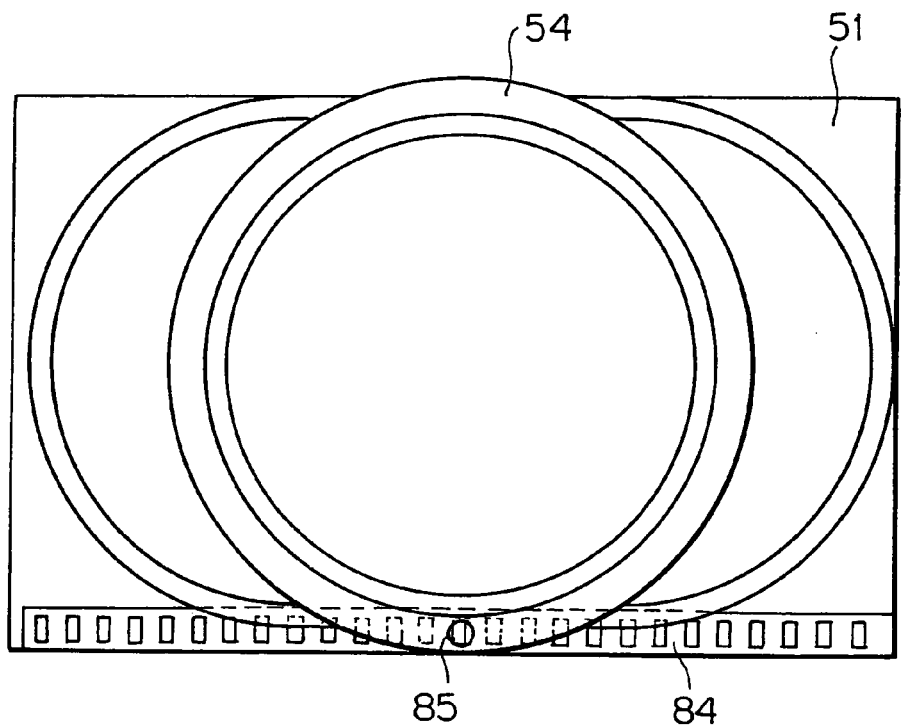
FIG. 10A is an explanatory view showing a position detecting system according to another embodiment of the present invention.
Figure 10B:
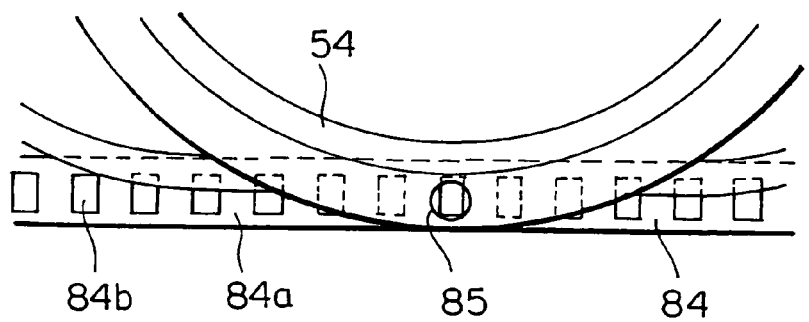
FIG. 10B is a partially enlarged view showing the position detecting system.

In the embodiment described above, the stop position is detected by the counting pulse number (counting exciting steps) with reference to the reference pulse number (reference exciting steps). However, other detecting system can be employed. For example, as shown in FIG. 10, a position sensing marker, made of a dark bar 84*a* and a plurality of bright boxes 84*b* arranged in line inside the dark bar 84*a*, and each of which corresponds to a specific position of the display screen of the LCD 51, is displayed on a bottom part of the display screen of the LCD 51 covered by the bezel 52. Then, a photo sensor 85 mounted on a back side of the ring-shaped partition member 54 detects the bright boxes 84*b*. Thus, the stop position can be detected.

In the embodiment described above, in the images of the dial image 56 and the pointer 57, the tachometer and the speedometer are respectively displayed as an analog meter and a digital meter. However, instead of these images, the tachometer and the speedometer may be respectively displayed as a digital meter and an analog meter.

Further, these two combination images of the tachometer and the speedometer may be alternately displayed by a manual switch at any time. Further, these combination images may be alternately displayed at the start position and the stop position.

In the embodiment described above, the motor 69 as a driving source is fixed on the substrate, and the rack 70*e* is fixed on the frame 68. Instead of this, the motor 69 may be fixed on the frame 68, and the rack 70e may be fixed on the substrate.

In the embodiment described above, a gear belt drive is used in the transmission 70. However, other drive such as a screw drive may be used in the transmission 70.

In the embodiment described above, the movement of the ring-shaped partition member 54 is visible. In addition, the movement may audible by providing a sound effect generator controlled by the CPU 80a for generating sound such as a buzz sound from the start to the stop of the movement.

In the embodiment described above, as shown in FIG. 2, when the movement of the ring-shaped partition member 54 is stopped, the status bars 66 of such as an oil level meter, a brake fluid meter, a water temperature meter, an exhaust temperature meter, an intake gas temperature meter, a washer level meter, and the like are displayed on the display area 90. However, instead of them, navigating data of a car-mounted navigation system or a rear view of a vehicle rear view system may be displayed on the display area 90.

In the embodiment described above, only one LCD 51 is used as a display of the display unit for a vehicle 1. However, another display may be used as an auxiliary display. The auxiliary display may be visible through the opening of the ring-shaped partition member 54 and slidable on the display screen of the LCD 51 by the transferring mechanism 67.

In the embodiment described above, an LCD is used as a display of the display unit for a vehicle 1. However, other displays such as an organic EL or a plasma display may be used for the display of the display unit for a vehicle 1.

In the embodiment described above of the invention, receiving a water temperature alarm signal from the input/output circuit 80f generates the emergency signal. However, receiving a tire pressure alarm signal from the input/output circuit 80g may generate the emergency signal. In this case, a general-view image of the vehicle and images of the tires are displayed on the display area 90. Further, the image of a tire indicating a lower pressure trouble may be displayed differently form the images of the other tires to get a driver's attention. For another example, when receiving a half-shut door alarm signal or a sheet belt alarm signal from the input/output circuit 80g, the CPU 80a may move the ring-shaped partition member 54 to the stop position and display a proper image on the display area 90 for getting a driver's attention.

In the embodiment described above, the ring-shaped partition member 54 is made of a plastic material. However, the ring-shaped partition member 54 may be made of other material such as metal.

Figure 11:
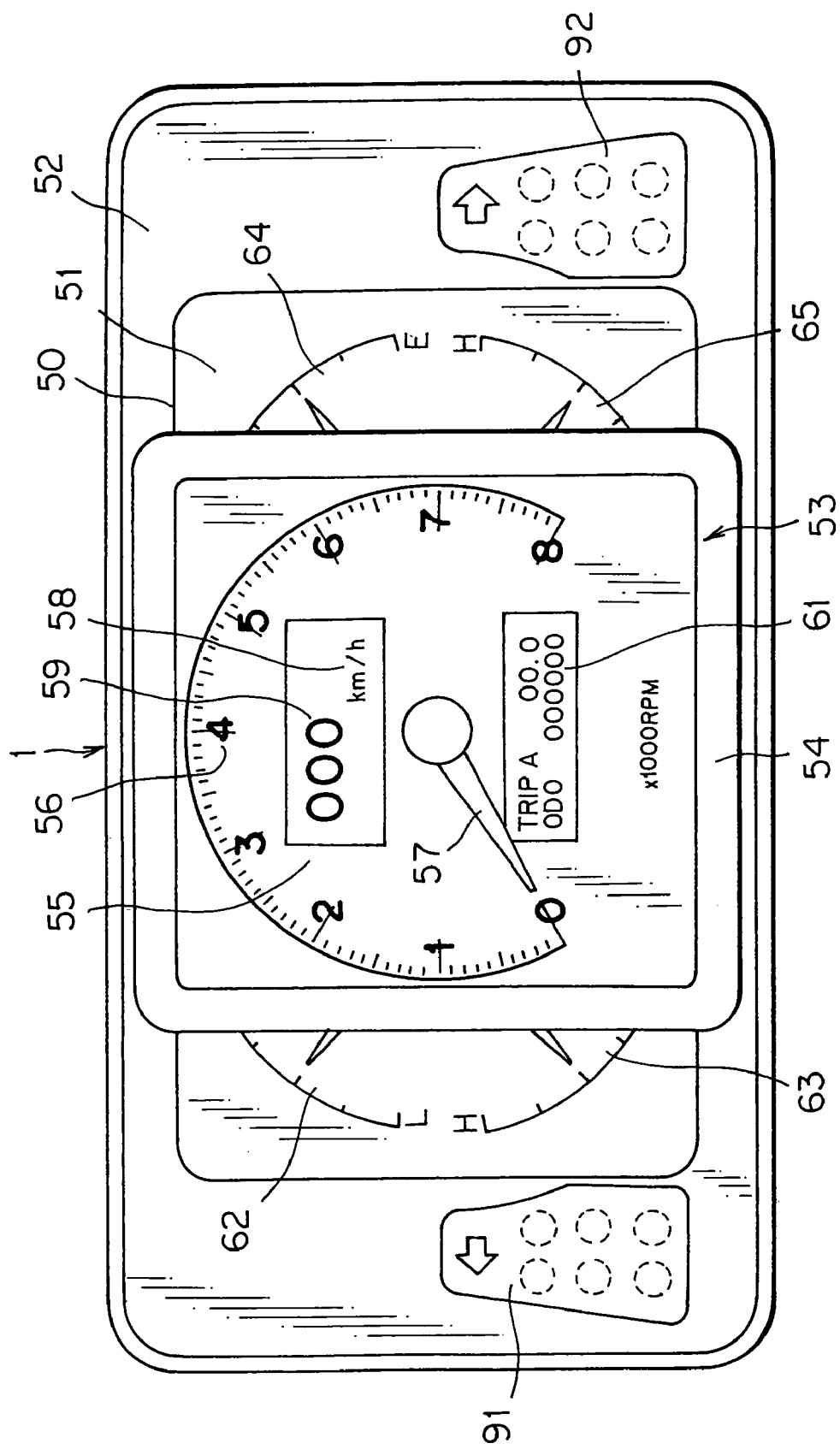
FIG. 11 is a front view showing a modified partition mechanism according to the present invention.

In the embodiment described above, the ring-shaped partition member 54 has a circular shape. However, the ring-shaped partition member 54 may have a square shape as shown in FIG. 11, a polygon shape, a semicircular and partially straight shape, or the like for partitioning the display screen of the graphic meter 50.

According to the present invention, there is provided a display unit displaying stereoscopic, novel and distinctive images at a low cost.

According to the present invention, when the transfer of the partitioning mechanism is interrupted by a trouble of the transferring mechanism, the main first vehicle related data is shown distinctively from the other by the ring-shaped partition member 54 surrounding the first vehicle related data.

According to the present invention, there is provided a display unit displaying a partially enlarged image so that the enlarged part looks like higher than the other parts, like an isolated stereoscopic image.

According to the present invention, the ring-shaped partition member 54 can be transferred smoothly.

According to the present invention, the transfer of the ring-shaped partition member 54 can be also recognized with a sound.

What is claimed is:

1. A display unit for a vehicle comprising:
a display device having first and second areas on a display screen; and
a controller for controlling the display device,
wherein:
the controller controls the display device either to display first vehicle related data at the first area, or to scroll the displayed first vehicle related data from the first area to the second area corresponding to a scrolling signal, and
the controller controls the display device to display second vehicle related data at the first area after the displayed first vehicle related data is scrolled out of the first area.

2. A display unit for a vehicle comprising:
a display device having first and second areas on a display screen; and
a controller for controlling the display device,
wherein:
said controller controls the display device either to display first vehicle related data at the first area, or to scroll the displayed first vehicle related data from the first area to the second area corresponding to a scrolling signal,
said controller controls the display device to display second vehicle related data at the first area after the displayed first vehicle related data being scrolled out of the first area,
said controller controls the display device to display third vehicle related data at the second area while displaying the first vehicle related data at the first area, and
said controller controls the display device not to display the third vehicle related data when controlling the display device to start scrolling the displayed first vehicle related data corresponding to said scrolling signal.

3. A display unit for a vehicle comprising:
a display device having first and second areas on a display screen;
a controller for controlling the display device;
a partitioning mechanism disposed on said display screen for surrounding the displayed first vehicle related data and separating the same form the other displayed data; and
a transferring mechanism for transferring the partitioning mechanism in synchronization with said first vehicle related data being scrolled,
wherein:
the controller controls the display device either to display first vehicle related data at the first area, or to scroll the displayed first vehicle related data from the first area to the second area corresponding to a scrolling signal, and the controller controls the display device to display second vehicle related data at the first area after the displayed first vehicle related data is scrolled out of the first area.

4. The display unit for a vehicle as claimed in claim 3, wherein the controller controls the display device to stop scrolling the displayed first vehicle related data when a transfer of the partitioning mechanism is interrupted.

5. The display unit for a vehicle as claimed in claim 3, wherein the partitioning member includes a partition for separating the displayed first vehicle related data from the other displayed data, and a lens for magnifying the displayed first vehicle related data.

6. The display unit for a vehicle as claimed in claim 3, wherein said transferring mechanism includes a frame supporting the partitioning mechanism at a front side of the display device and extending at a backside of the display device, a motor attached to the backside of the display device, and a transmission device for transmitting driving power from the motor to the frame to transfer the frame.

7. The display unit for a vehicle as claimed in claim 3, further comprising a sound generator for producing sound effect accompanying the transfer of the partitioning mechanism.

* * * * *